United States Patent [19]

Kawahara et al.

[11] Patent Number: 5,482,762
[45] Date of Patent: Jan. 9, 1996

[54] MAGNETIC RECORDING MEDIUM

[75] Inventors: Setsuko Kawahara; Yasushi Nakano; Yuji Shimizu; Shoichi Sugitani, all of Hino, Japan

[73] Assignee: Konica Corporation, Japan

[21] Appl. No.: 99,252

[22] Filed: Jul. 29, 1993

Related U.S. Application Data

[63] Continuation of Ser. No. 718,654, Jun. 21, 1991, abandoned.

[30] Foreign Application Priority Data

Jun. 27, 1990 [JP] Japan ................................ 2-171220

[51] Int. Cl.$^6$ ............................... G11B 5/66; B32B 7/02; B32B 5/16
[52] U.S. Cl. .................. 428/212; 428/329; 428/336; 428/685; 428/900; 428/694 B; 428/694 BP; 428/694 BA; 428/694 BM; 428/694 BR
[58] Field of Search .................................. 428/212, 329, 428/336, 685, 900, 694 B, 694 BP, 684 BA, 694 BM, 694 BR

[56] References Cited

U.S. PATENT DOCUMENTS

| | | | |
|---|---|---|---|
| 4,851,289 | 7/1989 | Ogawa et al. | 428/900 |
| 4,857,388 | 8/1989 | Ogawa et al. | 428/900 |
| 4,911,951 | 3/1990 | Ogawa et al. | 428/900 |
| 4,992,330 | 2/1991 | Kawahara et al. | 428/329 |

*Primary Examiner*—L. Kiliman
*Attorney, Agent, or Firm*—Jordan B. Bierman; Bierman and Muserlian

[57] ABSTRACT

A magnetic recording medium having two magnetic layers is disclosed. The magnetic recording medium has a surface fatty acid content of 0.38 to 2.53 μg per square centimeter and a magnetic layer closest to a support contains ferromagnetic powder of Co-containing FeOx wherein x represents 1.33 to 1.43. It is improved in electromagnetic conversion characteristics, light-shielding property and erasing property, and is suitably used for audio or video recording medium.

6 Claims, No Drawings

MAGNETIC RECORDING MEDIUM

This application is a continuation of application Ser. No. 07/718,654, filed Jun. 21, 1991, now abandoned.

FIELD OF THE INVENTION

The present invention relates to a magnetic recording medium, more specifically to a magnetic recording medium improved in electromagnetic conversion characteristics, light-shielding property and erasing property.

BACKGROUND OF THE INVENTION

Recently, there has been a growing demand for magnetic recording mediums such as magnetic recording tapes that are capable of reproducing pictures and sounds of higher quality. To satisfy such demand, further improvement in electromagnetic conversion characteristics, light-shielding property and erasing property (a property of not changing its electromagnetic conversion characteristics with the passage of time) must be attained. For this purpose, a great deal of efforts have been made in the art.

As part of these efforts, Japanese Patent Publication Open to Public Inspection (hereinafter abbreviated as Japanese Patent O.P.I. Publication) No. 61230/1986 proposes the use of a larger amount of $Fe^{2+}$ in a magnetic layer, aiming at improving light-shielding property and erasing property, as well as increasing output. However, when contained in a magnetic layer in a larger amount, $Fe^{2+}$ due to its poor dispersibility, tends to make the surface of the magnetic layer rough and cause dropouts to lower the electromagnetic conversion characteristics of a recording medium. Therefore, the use of an excessive amount of $Fe^{2+}$ should be avoided.

On the other hand, the use of $Fe^{2+}$ in a smaller amount was proposed as a measure to prevent the surface of a magnetic layer from getting rough. In this case, lowering in light-shielding property which may occur due to the scarcity of $Fe^{2+}$ has to be avoided by the employment of carbon black. However, the use of carbon black inevitably results in the reduction of the content of magnetic powder in a magnetic layer, which then leads to the deterioration of electromagnetic conversion characteristics.

The surface of a magnetic layer can be prevented from getting rough by the addition of a lubricant (fatty acid).

Proposals that were made as to the effective use of a lubricant include: (a) employing a lubricant in such a manner that the average lubricant content of a lower magnetic layer will be ¾ or ½ of that of an upper magnetic layer (see Japanese Patent O.P.I. Publication No. 264509/1986); (b) employing a lubricant only in a lower magnetic layer (see Japanese Patent O.P.I. Publication No. 200426/1983); and (c) employing a lubricant in such a manner that the average lubricant content of a lower magnetic layer will be 1.2 times higher than that of an upper magnetic layer (see Japanese Patent O.P.I. Publication No. 264509/1986).

These efforts, though they were made to improve the running durability of a magnetic recording medium, could not be rewarded with good fruits; by the method (b), a recording medium can be kept in close contact with a magnetic head, but its durability against repeated running cannot be improved to a sufficient level. In the method (c), a recording medium cannot be in close contact with a head, and, in addition, there may occur such problems as lowered running durability due to the plasticization of a magnetic layer, and sticking of dust to a magnetic head at high temperatures.

When employed in combination with a certain kind of magnetic substance, a lubricant tends to cause such problems as the blooming of a magnetic layer surface and the staining of a magnetic head. Taking such side effects of a lubricant into consideration, it may be concluded that the characteristics of a magnetic recording medium cannot be improved by simply adding a lubricant.

SUMMARY OF THE INVENTION

The object of the invention is to provide a magnetic recording medium improved in electromagnetic conversion characteristics, light-shielding property and erasing property.

A magnetic recording medium of the invention has a support and superimposed thereon a 1st magnetic layer and a 2nd magnetic layer in this sequence, wherein the recording medium has a surface fatty acid content of 0.38 to 2.53 μg per square centimeter and the 1st magnetic layer contains ferromagnetic powder of Co-containing $FeO_x$ wherein x represents 1.33 to 1.43.

DETAILED DESCRIPTION OF THE INVENTION

The recording medium of the invention has a non-magnetic support and superimposed thereon a 1st magnetic layer (lower layer) and a 2nd magnetic layer (upper layer) in this sequence.

A backcoating layer may be provided on the backside of the support for the prevention of charging and image transferring. An intermediate layer such as an adhesive layer (or a sticking layer) may be provided between the support and the lower layer.

The magnetic recording layer of the invention has a specific amount of a fatty acid in its surface. For this feature, a specific amount of a fatty acid is added to the upper layer. It is preferred that the lower layer also contain a certain amount of a fatty acid.

It is generally known that a part of a fatty acid contained in magnetic layers is adsorbed by ferromagnetic powder, another part of the fatty acid remains in a binder, and the remainder oozes out through the surface of a magnetic recording medium. By adding a suitable amount of a fatty acid in the upper layer, the surface fatty acid content can reach the value as specified above (0.38 to 2.53 μg/cm$^2$). To obtain the above-specified surface fatty acid content, it is preferred that the lower layer also contain a certain amount, equal or slightly larger than the amount in the upper layer, of a fatty acid.

The surface fatty acid content of the magnetic recording medium is dependent on the type and amount of ferromagnetic powder and binder. Usually, the above-specified fatty acid content can be obtained by the addition of 0.1 to 5 parts by weight of a fatty acid per 100 parts by weight of ferromagentic powder. The preferable amount of a fatty acid to be added to the magnetic layers can be determined easily by experiments.

When an urethane elastomer (as employed in the following examples) is used as a binder, it is preferable to employ a fatty acid in an amount of 0.5 to 4 parts by weight per 100 parts by weight of ferromagnetic powder.

The use of the preceding amount of a fatty acid in the magnetic layers reduces the frictional resistance of the surface, resulting in improved running durability and electric characteristics of the recording medium, as well as the elimination of such troubles as blooming and magnetic head contamination.

The fatty acid content of the surface of the magnetic recording medium of the invention can be examined experimentally by the following method:

To a specimen of the surface of a magnetic recording medium (area: 253 cm$^2$ width: ½ inch, length: 2 m), 50 ml of cyclohexanone is added, and the solution is allowed to stand for 2 minutes. After filtering out the solution, the specimen is washed with a small amount of cyclohexanone. This liquid is added to the extract liquid. To the resulting solution, 5 ml of a mixed solution of methyl palmitate/cyclohexanone of which the concentration has been adjusted to 40 ppm is added. The cyclohexanone is distilled away by means of a rotary evaporator. To the so-concentrated extract, 0.2 ml of cyclohexanone is added. 1 μl-aliquots of this mixture are then subjected to gas chromatography. Based on the relationship between the densities of the palmitic acid and the fatty acid and their respective peak areas, the amount of the fatty acid can be obtained from a calibration line which has been prepared in advance. This measurement is performed at room temperature. At 20 to 25° C., the amount of the fatty acid as measured substantially does not depend on temperature. When the specimen is dipped in cyclohexanone for 1.5 minutes or longer, the amount of the fatty acid substantially does not depend on the dipping time.

The magnetic recording medium of the invention, due to its small frictional resistance, is improved both in durability and electric characteristics, and free from such troubles as head stains and blooming.

-Lower Layer-

The lower layer of the magnetic recording medium of the invention comprises ferromagnetic powder and a binder. In the invention, as the ferromagnetic powder, it is essential to use Co-containing FeOx (wherein X=1.43 to 1.33). By the use of this ferromagnetic substance, electromagnetic conversion characteristics and light shielding property can be improved without using a larger amount of carbon black, which may lower the dispersibility of the ferromagnetic powder.

For improved low frequency characteristics (in particular, color output), the Co-containing FeOx to be used in the invention preferably has a coercive force (Hc) of 550 to 700 Oe. For a higher recording density and an improved S/N ratio, the Co-containing FeOx preferably has a BET value of 35 to 45 m$^2$/g. Further, for improved orientation and packing properties and a higher output, the longer axis/shorter axis ratio of the Co-containing FeOx is preferably 8 to 15.

As the binder, it is preferable to employ a resin modified with a functional group, in particular, a modified vinyl chloride resin, a modified polyurethane resin (including a urethane elastomer) and a modified polyester resin. The preferred examples of the functional group are —SO$_3$M, —OSO$_2$M, —COOM and

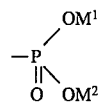

(wherein M represents a hydrogen atom or an alkali metal such as lithium and sodium; M$^1$ and M$^2$ each independently represent a hydrogen, lithium, potassium, sodium or an alkyl group, and M$^1$ and M$^2$ may be either identical with or different from each other). These functional groups improve the affinity of the resin to the ferromagnetic powder. Improved affinity between the resin and the ferromagnetic powder may further increase the dispersibility of the ferromagnetic powder, and prevent the agglomeration of the ferromagnetic particles effectively, thereby permitting the production a magnetic coating composition with excellent stability. By the use of such stable coating composition, it is possible to obtain a magnetic recording medium with improved, well-balanced higher and lower frequency characteristics and excellent running durability.

The above modified resins may be employed either alone or in combination. In the latter case, the combined use of a modified polyurethane resin and a modified vinyl chloride resin is preferable. The above modified resin can be prepared by subjecting a vinyl chloride resin, a polyurethane resin or a polyester resin and a compound containing an anionic functional group and chlorine in its molecule such as

to condensation by a dehydrochlorination reaction.

In the invention, it is also possible to use as the binder thermoplastic resins, thermosetting resins, reactive resins, electron beam irradiation setting resins that have been normally employed as the binder in the industry, or the mixture of these resins. These conventional resins may be employed in combination with the above modified resins, and in this case, the combination of one of the abovementioned modified resin and a copolymer of vinyl chloride and vinyl acetate is preferable.

Examples of the thermoplastic resin include vinyl chloride-vinyl acetate copolymers, vinyl chloride-vinylidene chloride copolymers, vinyl chloride-acrylonitrile copolymers, acrylic ester-acrylonitrile copolymers, acrylic ester-vinylidene chloride copolymers, methacrylic ester-vinylidene chloride copolymers, methacrylic ester-ethylene copolymers, polyvinyl fluoride, vinylidene chloride-acrylonitrile copolymers, acrylonitrile-butadiene copolymers, polyamide resins, polyvinyl butyral, cellulose derivatives (e.g. cellulose acetate butylate), cellulose diacetate, cellulose triacetate, cellulose propionate, nitrocellulose), styrene-butadiene copolymers, polyester resins, chlorovinyl ether-acrylic acid ester copolymers, amino resins and synthetic rubber. These thermoplastic resins may be used either alone or in combination.

Examples of the thermosetting resins and the reactive resins include phenol resins, epoxy resins, polyurethane settable resins, urea resins, melamine resins, alkyd resins, silicone resins, acryl-based reactive resins, a mixture of a high molecular polyester resin and an isocyanate prepolymer, a mixture of a methacrylate copolymer and a diisocyanate prepolymer, urea-formaldehyde resins and polyamine resins. These resins may be employed either alone or in combination.

Examples of the electron beam irradiation setting resin include unsaturated prepolymers of maleic anhydride type, urethane-acryl type, epoxy-acryl type, polyester-acryl type, polyether-acryl type, polyurethane-acryl type or polyamide-acryl type; and polyfunctional monomers of ether-acryl type, urethane-acryl type, epoxy-acryl type, phosphoric acid ester-acryl type, aryl type or hydrocarbon type.

They may be employed either singly or in combination.

The amount of the binder resin in the lower layer is normally 1 to 200 parts by weight, preferably 1 to 50 parts by weight, per 100 parts by weight of the Co-containing FeOx.

An excessive amount of the binder means an insufficient amount of the ferromagnetic powder, which may lower the packing density of the recording medium. On the other hand, if the amount of the binder resin is too small, the mechanical strength of the magnetic layer decreases, resulting in poor running durability.

In the present invention, as the hardener, an aromatic or aliphatic polyisocyanate may be employed in combination with the preceding binder.

Usable aromatic polyisocyanate are tolylene diisocyanate (TDI) and an adduct of this isocynate and an active hydrogen compound, with preference given to those with an average molecular weight of 100 to 3,000.

Usable aliphatic polyisocyanate are hexamethylene diisocyanate (HMDI) and an adduct of this isocynate and an active hydrogen compound, with preference given to those with an average molecular weight of 100 to 3,000. In particular, non-alicyclic polyisocyanates and active hydrogen compound adducts of these isocyanates are preferable.

The weight ratio of the aromatic or aliphatic polyisocyanate and the binder is normally 1/20 to 7/10, preferably 1/10 to 1/2.

The lower layer may further contain various additives such as a lubricant, a non-magnetic abrasive, conductive powder and a surfactant in such amounts as will not affect adversely the attainment of the object of the invention.

Examples of the lubricant include silicone oil, graphite, molybdenum disulfide and an aliphatic acid ester comprising a monobasic aliphatic acid having 12–20 carbon atoms (e.g. stearic acid) and a monovalent alcohol having 3–26 carbon atoms.

Examples of the abrasive include alumina (e.g. $\alpha$-$Al_2O_3$ (corundum)), artificial corundum, fused alumina, silicon carbide, chromium oxide, diamond, artificial diamond, garnet and emery (main components: corundum and magnetite). The abrasive is added in an amount of not more than 20 parts by weight per 100 parts by weight of the ferromagnetic powder, and preferably has an average particle size of not more than 0.5 µm, more preferably not more than 0.4 µm.

Examples of the conductive powder include carbon black, graphite, silver powder and nickel powder. Examples of the surfactant include natural, nonionic, anionic, cationic and amphoteric surfactants. The conductive powder is employed preferably in an amount of not more than 10 parts by weight per 100 parts by weight of the ferromagnetic powder, and preferably has an average particle size of not more than 40 mµ, more preferably not more than 25 mµ.

The thickness of the lower layer preferably exceeds 1.5 µm, more preferably not less than 2.0 µm.

-Upper Layer-

The upper layer basically comprises ferromagnetic powder and a binder. As the ferromagnetic powder, use can be made of ferromagnetic powder that has been conventionally employed in magnetic recording mediums, but it is preferable to employ those mentioned in the part of the lower layer. The usable binders are the same as those mentioned in the part of the lower layer.

When the lower layer does not contain a fatty acid, the upper layer does contain it. The usable fatty acids are the same as those mentioned in the part of the lower layer.

Like the lower layer, the upper layer may contain various additives such as a lubricant, a non-magnetic abrasive, conductive powder and a surfactant. The examples and amounts of these additives are the same as those mentioned in the part of the lower layer. When the upper layer contains the above-mentioned lubricant and the non-magnetic abrasive, its magnetic head contact characteristics (e.g. sliding property, wear resistance) can be remarkably improved. Further, by the addition of the conductive powder and the surfactant to the upper layer, the surface electric resistance of this layer can be effectively reduced, leading to the elimination of noises ascribable to an electric discharge, as well as to the prevention of dropouts ascribable to the sticking of dust.

The thickness of the upper layer is preferably larger than 0.05 µm but smaller than 1.5 µm, more preferably 0.01 to 1.0 µm.

-Support-

The support is prepared from a non-magnetic substance, the examples of which include polyesters such as polyethylene terephthalate and polyethylene-2,6-naphthalate; polyolefins such as polypropylene; cellulose derivatives such as cellulose triacetate and cellulose diacetate; and plastics such as polyamide and polycarbonate; metals such as Cu, Al and Zn; and ceramics such as glass, boron nitride and Si carbide.

The support is employed in the form of tape, film, sheet, card, disc or drum.

The thickness of the support is normally 3 to 100 µm, preferably 5 to 50 µm, when they are in a film or sheet form. In the case of disc or card form, the thickness is about 30 µm to 10 mm. In the case of drum form, the thickness can be determined according to the type of recorder.

The support may be of either single-layer or multi-layer structure, and may be subjected to surface treatment such as corona discharge treatment.

-Preparation of Magnetic Recording Medium-

The magnetic recording medium of the invention can be prepared by processes that have been employed to prepare conventional multi-layer magnetic recording mediums. Typically, the magnetic recording medium can be prepared by dispersing ingredients for forming the magnetic layers in a solvent, mixing and kneading to form a magnetic coating composition, followed by the application of this composition onto the support.

Examples of the solvent used in the preparation of the coating composition include ketones such as acetone, methyl ethyl ketone (MEK), methyl isobutyl ketone (MIBK) and cyclohexanone; alcohols such as methonol, ethanol and propanol; esters such as methyl acetate, ethyl acetate, butyl acetate, propyl acetate, ethyl lactate and ethylene glycol monoacetate; ethers such as diethylene glycol dimethyl ether, 2-ethoxyethanol, tetrahydrofuran and dioxane; aromatic hydrocarbons such as benzene, toluene and xylene; and halogenated hydrocarbons such as methylene chloride, ethylene chloride, carbon tetrachloride, ethylene chlorohydrin and dichlorobenzene.

In the preparation of the coating composition, the ferromagnetic powder and other components are simultaneously or separately incorporated into a kneader. In the latter case, for example, the ferromagnetic powder is firstly added to a solution that contains a dispersant, followed by kneading for a prescribed period of time. Then, other components are added, followed by further kneading to form a coating composition.

Various kneaders can be used for kneading the ingredients for forming the coating composition. Examples of the usable kneader include a twin roll mill, a triple roll mill, a ball mill, pebble mill, a sand grinder, a Sqegvari attritor, a high-speed impeller disperser, a high-speed stone mill, a high-speed impact mill, a disper kneader, a high-speed mixer, a homogenizer and a ultrasonic disperser.

Examples of the manner of applying the coating composition include wet-one-wet, wet-on-dry, dry-on-wet and dry-on-dry. Of them, the wet-on-wet and wet-on-dry methods are preferable. Most preferable is the wet-on-wet method not only because it is improved in efficiency but also it permits the provision of a thin upper magnetic layer.

Examples of the method of applying the coating composition on the support include gravure coating, knife coating, wire bar coating, doctor blade coating, reverse roll coating, dip coating, air knife coating, calender coating, squeeze coating, kiss coating and fountain coating.

A coating film provided on the support by the application of the magnetic coating composition is, before drying, subjected to magnetic orientation treatment. The dried film is then subjected to surface smoothing treatment by means of a super calender roll or the like, and cut into desired shape to obtain the magnetic recording medium of the invention.

EXAMPLES

The present invention will be described in more detail according to the following examples, in which "parts" means "parts by weight".

A series of inventive and comparative magnetic video tapes were each prepared by the following method:

Coating compositions for the upper and lower magnetic layers were prepared by using the ingredients described below. To each coating composition, 5 parts by weight of a polyfunctional isocyanate compound (Coronate; manufactured by Nippon Polyurethane Industry Co., Ltd.) was added. The lower layer coating composition was then applied onto to a 14.3 μm-thick polyethylene terephthalate film, followed by the application of the upper layer coating composition. The application was performed by the wet-on-wet method in such a manner that the dry thicknesses of the lower and upper layers became 3 μm and 0.7 μm, respectively.

| Lower Layer Coating Composition | |
| --- | --- |
| Co—FeOx (with the physical properties shown in Table 1) | 100 parts |
| Urethane elastomer (of the kind shown in Table 1) | 10 parts |
| Vinyl chloride-vinyl acetate copolymer | 5 parts |
| Carbon black (average particle size: 80 mμ) | 5 parts |
| Fatty acid (of the kind shown in Table 1) | in an amount shown in Table 1 |
| Butyl stearate | 2 parts |
| Methyl ethyl ketone | 100 parts |
| Cyclohexanone | 100 parts |
| Toluene | 100 parts |
| Upper Layer Coating Composition | |
| Co—FeOx (with the physical properties shown in Table 1) | 100 parts |
| (α-Al₂O₃ (average particle size: 0.4 μm) | 3 parts |
| Urethane elastomer (of the kind shown in Table 1) | 10 parts |
| Vinyl chloride-vinyl acetate copolymer | 5 parts |
| Carbon black (average particle size: 200 mμ) | 0.4 part |
| Fatty acid (of the kind shown in Table 1) | in an amount shown in Table 1 |
| Butyl stearate | 2 parts |
| Methyl ethyl ketone | 100 parts |
| Cyclohexanone | 100 parts |
| Toluene | 100 parts |

The surface fatty acid content of each of the resulting video tapes was measured by the aforementioned method. Each video tape was examined for surface roughness (Ra) and physical properties by the methods described below. The results of the examinations are shown in Table 2. <Ra> Measured by means of a Talystep roughness meter (manufactured by Rank Taylor Hobson) under the following conditions:

Stylus: 2.5×0.1 μm

Needle pressure: 2 mg

Cut of filter: 0.33 Hz

Measurement speed: 2.5 μm/sec

Reference length: 0.5 mm

In the surface roughness curve obtained, roughness with a peak-to-valley distance of not less than 0.002 μm was neglected.

<Chroma output, Chroma S/N, RF output and Lumi S/N>

Each expressed as a relative value to that of a tape prepared in Comparative Example 5 which was set at 0 dB.

Chroma output (dB): The output of a chroma signal with a frequency of 500 KHz was measured by means of a video deck designed for the chroma output measurement.

Chroma S/N: An S/N difference in a 100% white signal was measured in comparison with a reference tape (manufactured by Konica Corp) by means of a noise meter (manufactured by Shibasoku).

RF output (dB): The output of an RF signal with a frequency of 4 MHz was measured by using a video deck designed for the RF output measurement.

Lumi S/N: An S/N difference in a chroma signal was measured in comparison with a reference tape (manufactured by Konica Corp) by means of a noise meter (manufactured by Shibasoku).

-Blooming-

The surface of each video tape was visually observed to examine whether there were any fatty acid deposits or not.

Deposits were observed: x

No deposits: ○

-Head Stain-

Using a video deck (HR-S7000, manufactured by JVC), each video tape was allowed to run for 100 hours at 40° C. and RH 80%. Thereafter, the magnetic head was visually observed to examine the formation of stains, and evaluation was made according to the following criterion:

A: Free from stains

B: Almost free from stains

C: Stains were formed

D: A lot of stains were formed

Comparative Example 5

Five parts of carbon black (average particle size: 80 mμ) was added to the coating composition for the upper layer prepared in Example 2, and the composition was then applied to a 14.3 μm-thick polyethylene terephthalate film in such a manner that the dry thickness of the coating layer would be 3.7 μm. As a result, a magnetic video tape with a magnetic layer of single-layer structure was obtained.

The so-prepared comparative tape was examined for surface roughness (Ra), surface fatty acid content, as well as physical properties. The results obtained are shown in Table 2.

Comparative Example 6

Three parts of α-$Al_2O_3$ (average particle size: 0.4 μm) was added to the the coating composition for the lower layer prepared in Example 2, and the composition was then applied to a 14.3 μm-thick polyethylene terephthalate film in such a manner that the dry thickness of the coating layer would be 3.7 μm. As a result, a magnetic video tape with a magnetic layer of single-layer structure was obtained.

The so-prepared comparative tape was examined for surface roughness (Ra), surface fatty acid content, as well as physical properties. The results obtained are shown in Table 2.

Examples 13 to 17

Magnetic video tapes were prepared in substantially the same manner as in Example 2, except that the thicknesses of the magnetic layers were varied to those shown in Table 3. The physical properties of these tapes are summarized in Table 3.

Comparative Examples 8 to 10

Magnetic video tapes were prepared in substantially the same manner as in Example 2, except that the thicknesses of the magnetic layers were varied to those shown in Table 3. The physical properties of these tapes are summarized in Table 3.

TABLE 1

| | Upper layer | | | | | | | | | Lower layer | | | | | | | | |
|---|---|---|---|---|---|---|---|---|---|---|---|---|---|---|---|---|---|---|
| | Ferromagnetic powder | | | | Urethane elastomer | Fatty acids content (parts) | | | | Ferromagnetic powder | | | | Urethane elastomer | Fatty acid content (parts) | | | |
| | X | Hc | BET | Axial ratio | Kind | MA | SA | PA | OA | X | Hc | BET | Axial ratio | Kind | MA | SA | PA | OA |
| Example 1 | 1.46 | 850 | 55 | 5.5 | b | 1.5 | 1.5 | — | — | 1.33 | 550 | 30 | 11.5 | b | 1.0 | 2.0 | — | — |
| Example 2 | 1.46 | 800 | 50 | 4.0 | b | 1.0 | 1.0 | — | — | 1.37 | 650 | 35 | 10.5 | b | 1.0 | 1.5 | — | — |
| Example 3 | 1.46 | 800 | 50 | 4.0 | b | 1.0 | 1.0 | — | — | 1.39 | 700 | 40 | 9.0 | b | 1.0 | 1.0 | — | — |
| Example 4 | 1.46 | 800 | 50 | 4.0 | b | 1.0 | 1.0 | — | — | 1.43 | 750 | 44 | 7.5 | b | 1.0 | 0.5 | — | — |
| Example 5 | 1.43 | 1000 | 60 | 3.8 | b | 1.0 | 2.0 | — | — | 1.37 | 750 | 42 | 7.9 | b | 1.0 | 1.5 | — | — |
| Example 6 | 1.39 | 750 | 45 | 7.5 | b | 1.0 | 1.5 | — | — | 1.37 | 600 | 35 | 9.0 | b | 1.0 | 1.5 | — | — |
| Example 7 | 1.46 | 800 | 50 | 4.0 | a | 1.0 | 1.0 | — | — | 1.37 | 650 | 35 | 10.5 | b | 1.0 | 1.5 | — | — |
| Example 8 | 1.46 | 800 | 50 | 4.0 | a | 1.0 | 1.0 | — | — | 1.37 | 650 | 35 | 10.5 | a | 1.5 | 1.5 | — | — |
| Example 9 | 1.46 | 800 | 50 | 4.0 | c | 1.0 | 1.0 | — | — | 1.37 | 650 | 35 | 10.5 | c | 0.5 | 1.5 | — | — |
| Example 10 | 1.46 | 800 | 50 | 4.0 | b | 1.0 | — | 1.0 | — | 1.37 | 650 | 35 | 10.5 | b | 1.0 | — | — | 1.0 |
| Example 11 | 1.46 | 800 | 50 | 4.0 | b | — | 1.0 | — | 1.0 | 1.37 | 650 | 35 | 10.5 | b | — | 1.0 | — | 1.0 |
| Example 12 | 1.46 | 800 | 50 | 4.0 | b | — | — | 0.5 | 0.5 | 1.37 | 650 | 35 | 10.5 | b | — | — | 0.5 | 0.5 |
| Comparative Example 1 | 1.46 | 800 | 50 | 4.0 | b | 2 | 3 | — | — | 1.37 | 650 | 35 | 10.5 | b | 3 | 2 | — | — |
| Comparative Example 2 | 1.46 | 800 | 50 | 4.0 | b | 0.5 | — | — | — | 1.37 | 650 | 35 | 10.5 | b | 0.5 | 0.5 | — | — |
| Comparative Example 3 | 1.46 | 800 | 50 | 4.0 | b | 1.0 | 1.0 | — | — | 1.46 | 650 | 35 | 10.5 | b | 1.0 | 1.5 | — | — |
| Comparative Example 4 | 1.39 | 800 | 50 | 4.0 | b | 1.0 | 1.0 | — | — | 1.46 | 650 | 35 | 10.5 | b | 1.0 | 1.5 | — | — |
| Compara- | 1.46 | 800 | 50 | 4.0 | b | 1.0 | 1.0 | — | — | 1.37 | 650 | 35 | 10.5 | b | — | — | — | — |

TABLE 1-continued

| | Upper layer | | | | | | | | | Lower layer | | | | | | | | |
|---|---|---|---|---|---|---|---|---|---|---|---|---|---|---|---|---|---|---|
| | Ferromagnetic powder | | | Urethane elastomer | Fatty acids content (parts) | | | | | Ferromagnetic powder | | | Urethane elastomer | Fatty acid content (parts) | | | | |
| | X | Hc | BET | Axial ratio | Kind | MA | SA | PA | OA | X | Hc | BET | Axial ratio | Kind | MA | SA | PA | OA |
| tive Example 7 | | | | | | | | | | | | | | | | | | |

Note 1: MA: myristic acid, SA: stearic acid, PA: palmitic acid, OA: oleic acid
Note 2: Kind of urethane elastomer
a: consisting of 4,4'-diphenylmethane diisocyanate, 1,4-butanediol and adipic acid (MW: 30,000)
b: consisting of 4,4'-diphenylmethane diisocyanate, 1,4-butanediol and adipic acid, and containing 0.05 mmol/g of a sodium salt of sulfonic acid (MW: 30,000)
c: consisting of tolylene diisocyanate, neopentyl glycol and adipic acid (MW: 30,000)

TABLE 2

| | Magnetic layer surface fatty acid content ($\mu g/cm^2$) | Magnetic layer surface roughness ($\mu m$) | Chroma | | RF output | Lumi | Blooming | Head stain |
|---|---|---|---|---|---|---|---|---|
| | | | Output | S/N | | S/N | | |
| Example 1 | 2.53 | 0.010 | +3.2 | +2.8 | +0.8 | +0.6 | ○ | A |
| Example 2 | 1.83 | 0.012 | +2.5 | +2.0 | +0.5 | +0.1 | ○ | A |
| Example 3 | 1.52 | 0.009 | +2.2 | +2.0 | +0.5 | +0.1 | ○ | A |
| Example 4 | 1.01 | 0.008 | +1.8 | +1.6 | +0.5 | +0.1 | ○ | A |
| Example 5 | 1.71 | 0.010 | +1.8 | +1.5 | +1.0 | +0.8 | ○ | A |
| Example 6 | 0.76 | 0.011 | +2.8 | +2.5 | +0.3 | 0 | ○ | A |
| Example 7 | 1.71 | 0.010 | +2.4 | +2.2 | +0.6 | +0.4 | ○ | A |
| Example 8 | 1.33 | 0.010 | +2.5 | +2.0 | +0.6 | +0.2 | ○ | A |
| Example 9 | 1.14 | 0.010 | +2.7 | +2.4 | +0.6 | +0.2 | ○ | A |
| Example 10 | 1.39 | 0.009 | +2.5 | +2.4 | +0.5 | +0.4 | ○ | A |
| Example 11 | 1.27 | 0.010 | +2.2 | +2.2 | +0.4 | +0.4 | ○ | A |
| Example 12 | 0.38 | 0.012 | +2.6 | +2.2 | +0.5 | +0.1 | ○ | A |
| Comparative Example 1 | 2.78 | 0.008 | +2.0 | +1.0 | -0.8 | -1.2 | X | C |
| Comparative Example 2 | 0.32 | 0.036 | +1.8 | -0.5 | -3.0 | +2.2 | ○ | D |
| Comparative Example 3 | 1.37 | 0.012 | 0 | +0.2 | 0 | 0 | ○ | A |
| Comparative Example 4 | 2.07 | 0.012 | -1.8 | -1.5 | -3.0 | -2.2 | ○ | A |
| Comparative Example 5 | 0.86 | 0.013 | 0 | 0 | 0 | 0 | ○ | A |
| Comparative Example 6 | 2.66 | 0.011 | +2.4 | +1.8 | -3.2 | -2.6 | X | D |
| Comparative Example 7 | 0.35 | 0.045 | +1.8 | -1.4 | -4.8 | -3.7 | ○ | D |

TABLE 3

| | Magnetic layer thickness ($\mu m$) | | Magnetic layer surface Fatty acid content ($\mu g/cm^2$) | Roughness Ra ($\mu m$) | Chroma | | RF output | Lumi | Blooming | Head stain |
|---|---|---|---|---|---|---|---|---|---|---|
| | Upper layer | Lower layer | | | Output | S/N | | S/N | | |
| Example 13 | 0.7 | 2.5 | 1.37 | 0.010 | +2.5 | +2.2 | +0.5 | +0.1 | ○ | A |
| Example 14 | 0.7 | 2.0 | 0.95 | 0.011 | +2.4 | +2.0 | +0.6 | +0.0 | ○ | A |

TABLE 3-continued

|  | Magnetic layer thickness (μm) | | Magnetic layer surface | | | | | | | |
|---|---|---|---|---|---|---|---|---|---|---|
|  | | | Fatty acid | | Chroma | | RF | Lumi | | |
|  | Upper layer | Lower layer | content (μg/cm²) | Roughess Ra (μm) | Output | S/N | output | S/N | Blooming | Head stain |
| Example 15 | 1.0 | 2.5 | 0.81 | 0.012 | +1.8 | +1.4 | +1.2 | +0.6 | ○ | A |
| Example 16 | 0.5 | 2.5 | 2.30 | 0.010 | +2.7 | +2.5 | +0.5 | +0.1 | ○ | A |
| Example 17 | 0.1 | 2.5 | 2.53 | 0.009 | +2.2 | +2.0 | +0.6 | +0.0 | ○ | A |
| Comparative Example 8 | 0.7 | 1.5 | 0.35 | 0.042 | +2.0 | −0.1 | +0.2 | −0.4 | ○ | D |
| Comparative Example 9 | 1.5 | 2.5 | 0.32 | 0.028 | +1.8 | +1.4 | −2.2 | −1.6 | ○ | D |
| Comparative Example 10 | 0.05 | 2.5 | 2.66 | 0.009 | −0.8 | −1.1 | −3.6 | −5.2 | X | C |

From the results shown in Tables 1 to 3, the following conclusions can be drawn:

(1) The video tapes of the invention of which the X value of FeOx and the surface fatty acid content fell within the scope of the invention were improved in electromagnetic conversion characteristics and free from blooming and magnetic head staining. In contrast, the comparative video tapes of which the X value of FeOx and the surface fatty acid content fell outside the scope of the inveniton were poor in electromagnetic conversion characteristics, underwent blooming and left stains on the magnetic head.

(2) In Examples 1 to 6, the properties of FeOx employed were slightly varied from Example to Example, but the kind of fatty acid was not changed. The resulting video tapes had different surface fatty acid contents. From this, it can be concluded that the surface fatty acid content is dependent on the properties of FeOx.

(3) In Examples 7 to 9, the type of urethane elastomer was varied from Example to Example, while the properties of FeOx and the kind of fatty acid were kept unchanged. The resulting video tapes had different surface fatty acid contents. From this, it is understood that the surface fatty acid content is affected by the type of urethane elastomer.

(4) In Examples 10 to 12, the type and amount of fatty acid were varied from Example to Example, while the properties of FeOx and the kind of urethane elastomer were kept unchanged. The resulting video tapes had different surface fatty acid contents. From this, it is understood that the surface fatty acid content is affected by the type and amount of fatty acid.

(5) In Comparative Example 1, the surface of the tape had an excessive fatty acid content. While, in Comparative Example 2, the surface fatty acid content was too small. The tape of Comparative Example 1 underwent blooming, and left a lot of stains on the magnetic head. The tape prepared in Comparative Example 2 had poor electromagnetic conversion characteristics due to its rough surface, and left a lot of stains on the magnetic head.

(6) The tapes prepared in Comparative Examples 3 and 4 each were poor in output, due to the excessively large X value of FeOx.

(7) The tapes prepared in Comparative Examples 5 and 6, each had a single-layer structure, could not be improved in chroma and lumi characteristics.

(8) The tape prepared in Comparative Example 7, which did not contain any fatty acid in its lower layer, had an extremely rough surface due to the scarcity of fatty acid in its surface, and eventually had poor electromagnetic conversion characteristics and left stains on the magnetic head.

(8) Examples 13 to 17 and Comparative Examples 8 to 10 were each performed to examine the effect of the thicknesses of the magnetic layers on the tape properties. The results demonstrate that the thickness of the lower layer is preferaby larger than 1.5 μm, and that of the upper layer is preferably larger than 0.05 μm but smaller than 1.5 μm.

What is claimed is:

1. A magnetic recording medium having a support and superimposed thereon a 1st magnetic layer and a 2nd magnetic layer each of which contains ferromagnetic powder and a binder in this sequence, wherein said recording medium has a surface fatty acid content of 0.38 to 2.53 micrograms per square centimeter and the 1st magnetic layer contains a binder and a ferromagnetic powder of Co-containing FeOx wherein x represents 1.33 to 1.43.

2. A magnetic recording medium according to claim 1 wherein the magnetic recording medium contains fatty acid in an amount of 0.1 to 5 weight parts per 100 weight parts of total amount of the ferromagnetic powder.

3. A magnetic recording medium according to claim 1 wherein the Co-containing FeOx has a coercive force Hc of 550 to 700 Oe.

4. A magnetic recording medium according to claim 1 wherein the Co-containing FeOx has a BET value of 35 to 45 $m^2/g$.

5. A magnetic recording medium according to claim 1 wherein the longer axis/shorter axis ratio of the Co-containing FeOx is 8:1 to 15:1.

6. A magnetic recording medium having a support and superimposed thereon a 1st magnetic layer and a 2nd magnetic layer each of which contains ferromagnetic powder and a binder in this sequence, wherein said recording medium contains fatty acid in an amount of 0.1 to 5 weight parts per 100 weight parts of total amount of the ferromagnetic powder and has a surface fatty acid content of 0.38 to 2.53 micrograms per square centimeter and the 1st magnetic layer contains a binder and a ferromagnetic powder of Co-containing FeOx wherein x represents 1.33 to 1.43 which powder has the longer axis/shorter axis ratio Co-containing FeOx being 8:1 to 15:1, a BET value of 35 to 45 $m^2/g$ and a coercive force Hc of 550 to 700 Oe.

* * * * *